United States Patent
Konanz

(10) Patent No.: US 7,144,344 B2
(45) Date of Patent: Dec. 5, 2006

(54) TENSIONER FOR A TRACTION DRIVE

(75) Inventor: Holger Konanz, Erlangen (DE)

(73) Assignee: INA-Schaeffler KG, Herzogenaurach (DE)

(*) Notice: Subject to any disclaimer, the term of this patent is extended or adjusted under 35 U.S.C. 154(b) by 0 days.

(21) Appl. No.: 11/107,631

(22) Filed: Apr. 15, 2005

(65) Prior Publication Data
US 2005/0181902 A1 Aug. 18, 2005

Related U.S. Application Data

(63) Continuation of application No. PCT/EP03/09858, filed on Sep. 5, 2003.

(30) Foreign Application Priority Data

Oct. 17, 2002 (DE) ................. 102 48 352

(51) Int. Cl.
F16H 7/08 (2006.01)
(52) U.S. Cl. ................................... 474/117
(58) Field of Classification Search ................ 474/101, 474/109, 117, 133, 135
See application file for complete search history.

(56) References Cited

U.S. PATENT DOCUMENTS

| | | | |
|---|---|---|---|
| 4,698,049 A * | 10/1987 | Bytzek et al. | 474/135 |
| 4,832,666 A * | 5/1989 | Henderson | 474/135 |
| 5,030,171 A * | 7/1991 | Henderson | 474/135 |
| 5,030,172 A * | 7/1991 | Green et al. | 474/135 |
| 5,236,396 A | 8/1993 | Golovatai-Schmidt et al. | |
| 5,250,009 A | 10/1993 | Sidwell et al. | |
| 5,348,514 A * | 9/1994 | Foley | 474/135 |
| 5,449,328 A | 9/1995 | Schmidt et al. | |
| 5,545,095 A * | 8/1996 | Henderson | 474/135 |
| 5,772,549 A * | 6/1998 | Berndt et al. | 474/135 |
| 5,795,257 A * | 8/1998 | Giese et al. | 474/109 |
| 2002/0119850 A1 | 8/2002 | Dutil | |

FOREIGN PATENT DOCUMENTS

| | | |
|---|---|---|
| DE | 41 24 636 A1 | 1/1993 |
| DE | 92 18 566 U | 8/1994 |
| DE | 44 31 801 A1 | 3/1996 |
| DE | 195 40 706 A | 5/1997 |
| DE | 196 47 225 A | 5/1997 |
| DE | 100 13 921 A | 9/2001 |
| JP | 2001153196 A | 6/2001 |

* cited by examiner

Primary Examiner—Vicky A. Johnson
(74) Attorney, Agent, or Firm—Henry M. Feiereisen

(57) ABSTRACT

A tensioner for a traction drive to maintain a belt under tension includes a base part and a pivot arm connected to the base part for swinging about a rotation axis and having a free end for rotatable arrangement of a roller which is supported on the power transmitting member. A torsion spring acts on the pivot arm for urging the roller against the belt and applies an axial force on a damping unit for damping an adjusting movement of the pivot arm. The damping unit includes a slitted friction bushing constructed to have a wedge ring with conical inner and outer surfaces for formfitting engagement in a circular ring shaped recess of the base part or the pivot arm. The recess has contact surfaces to complement the inner and outer surfaces of the friction bushing for formation of two conical contact zones.

20 Claims, 3 Drawing Sheets

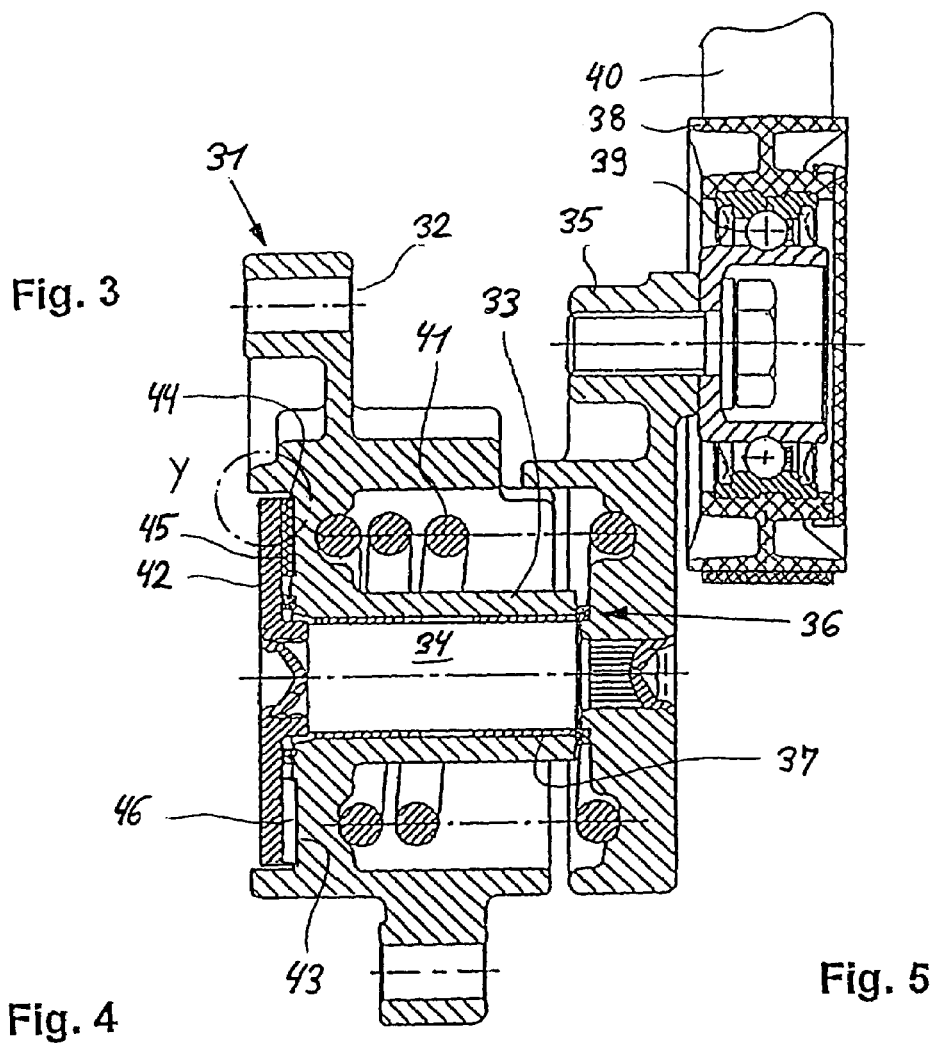
Fig. 3
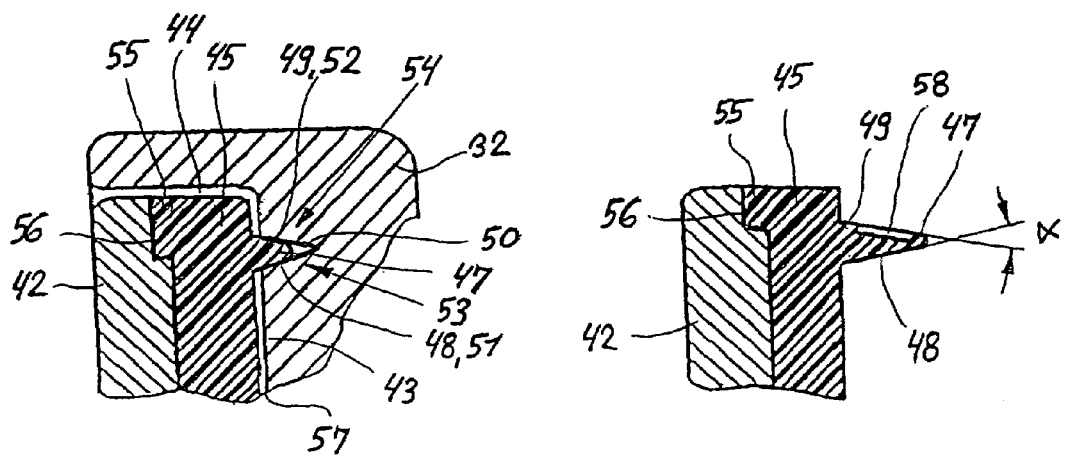
Fig. 4
Fig. 5

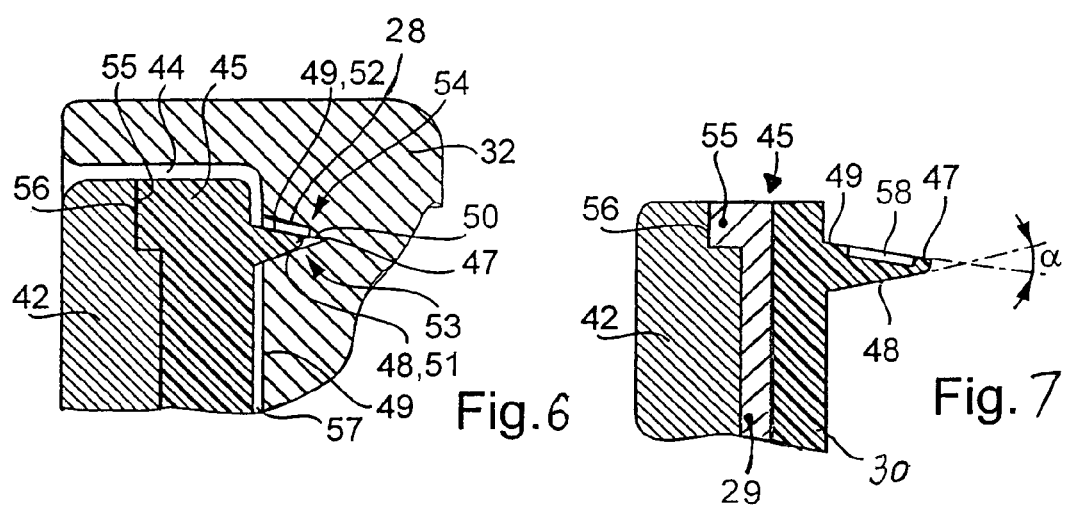

TENSIONER FOR A TRACTION DRIVE

CROSS-REFERENCES TO RELATED APPLICATIONS

This application is a continuation of prior filed copending PCT International application no. PCT/EP2003/009858, filed Sep. 5, 2003, which designated the United States and on which priority is claimed under 35 U.S.C. §120, and which claims the priority of German Patent Application, Serial No. 102 48 352.3, filed Oct. 17, 2002, pursuant to 35 U.S.C. 119(a)–(d).

BACKGROUND OF THE INVENTION

The present invention relates, in general, to a tensioner by which a power transmitting member, e.g. a belt for a traction drive, can be maintained under tension.

Nothing in the following discussion of the state of the art is to be construed as an admission of prior art.

German patent publication no. DE 196 47 225A describes a tensioner which includes a base part restrained against rotation and a pivot arm supporting a roller which is urged against a power transmitting member by a torsion spring arranged between the base part and the pivot arm. The base part has a symmetry axis which defines at the same time the rotation axis for the pivot arm. A damping unit is arranged between the pivot arm and the rotation axis and includes a thrust cone which engages a friction cone of the pivot arm. The thrust cone is urged against the friction cone by a compression spring which is placed between the thrust cone and the base part. This prior art damping unit is complex as a result of the great number of components, and is bulky so as to require a large installation space for realizing a sufficient friction surface between the thrust cone and the friction cone.

It would therefore be desirable and advantageous to provide an improved tensioner to obviate prior art shortcomings and to provide a compact damping unit with increased friction torque, while still being reliable in operation.

SUMMARY OF THE INVENTION

According to one aspect of the present invention, a tensioner for a traction drive to maintain a power transmitting member, e.g. a belt, under tension, includes a base part, a pivot arm connected to the base part for rotation about a rotation axis and having a free end for rotatable arrangement of a roller which is supported on the power transmitting member, a spring member acting on the pivot arm for urging the roller against the power transmitting member, and a damping unit acted upon by an axial force of the torsion spring for damping an adjusting movement of the pivot arm, wherein the damping unit includes a slitted friction bushing disposed in concentric surrounding relationship to the rotation axis and constructed to form a wedge ring having conical inner and outer surfaces for formfitting engagement in a circular ring shaped recess formed in a component selected from the group consisting of the base part and the pivot arm, wherein the recess has contact surfaces to complement the inner and outer surfaces of the friction bushing for formation of two conical contact zones.

The present invention resolves prior art problems by the arrangement of a slitted friction bushing disposed in surrounding relationship to the rotation axis of the tensioner and configured as a wedge ring or double wedge ring. Suitably, the inner and outer surfaces of the friction bushing have same conicity. The slitted friction bushing can be suited in an optimum way to the corresponding contact surfaces of the component, base part or pivot arm, which interacts with the friction bushing. The friction bushing effects a wanted rise of the friction torque. The damping unit provides a separation of the functions friction generation and sliding support between the base part and the pivot. This functional separation has the added advantage that wear in the area of the tapered or conical contact zones has no impact on the right-angled disposition of the pivot arm in relation to the base part. As a consequence of the disposition of the friction bushing according to the invention in radially distanced surrounding relationship to the rotation axis of the pivot bearing of the tensioner, the damping unit has no impact on the support of the pivot arm and no impact on the shape and length of the pivot arm.

By arranging the friction bushing directly or indirectly between the base part and the pivot arm, the spring member, e.g. a torsion spring, is able to apply an axial force directly upon the friction bushing and thus upon the conical inner and outer surfaces of the friction bushing, thereby realizing a high friction force to implement an effective damping of the adjusting movements of the pivot arm. The damping unit according to the invention is hereby applicable for any type of tensioners having a pivot arm.

According to another feature of the present invention, a thrust washer may be connected to the base part, wherein the pivot arm may have a hub which is rotatably supported on a pin of the base part, thereby defining a pivot bearing, with the friction bushing being disposed axially between the thrust washer and the hub. Instead of the provision of a thrust washer, the base part may also be configured with a flange, in which case the friction bushing is disposed axially between the flange and the hub.

According to another feature of the present invention, a bearing pin may be connected in fixed rotative engagement with the pivot arm and rotatably received in a guide bush of the base part to thereby define a pivot bearing, with the friction bushing disposed axially between the base part and a flange of the pivot arm or thrust washer connected to the pivot arm.

According to another feature of the present invention, a thrust washer may be connected in fixed rotative engagement with one component of the group consisting of base part and pivot arm, with the recess being formed in the other component of the group, wherein the friction bushing is connected to the thrust washer and formfittingly engages the recess with the conical inner and outer surfaces. Thus, the thrust washer may be connected in fixed rotative engagement to the base part, and the recess may be formed in the swingable pivot arm for engagement by the friction bushing, or the thrust washer may be connected in fixed rotative engagement to the pivot arm, and the recess may be formed in the base part for engagement by the friction bushing.

According to another feature of the present invention, the conical inner and outer surfaces of the friction bushing may converge at a taper angle of $\leq 35°$. The friction bushing forms a double wedge to effect a significant increase of the friction force and to allow the wanted separation of the functions friction generation and sliding friction of the tensioner. System-based wear of the friction surfaces of the friction bushing thus has no impact on the right-angled disposition of the moving components of the tensioner.

According to another feature of the present invention, the friction bushing may be made of plastic. As an alternative, the provision of a two-part friction bushing may, of course, also be conceivable and may involve a separate friction lining made of plastic and applied on a bushing that forms a carrier. To optimize wear resistance, the friction bushing may be made of glass fiber reinforced plastic or the friction lining may be made of glass fiber reinforced plastic. Of course, the friction bushing may be made of any other suitable material known to the artisan that generally follows the concepts outlined here. For example, the friction bushing may also be made of organic plastic.

According to another feature of the present invention, the inner surface and/or outer surface of the friction bushing may be profiled or provided with a structure. A suitable profile involves provision of the inner surface and/or outer surface with grooves or indentations that radiate out, or creation of a surface with a waffle-like texture. The profiling has hereby especially the task to pick up wear-based abrasions from the contact zone between the inner and outer surfaces of the friction bushing, on one hand, and from the conical recess in the associated component, on the other hand. The groove profile may hereby advantageously be so configured that the abrasions move via the texture or profile, as a consequence of the adjusting movement of the involved component, i.e. are removed from the contact zone. Thus, the noise level is significantly lowered.

As an alternative, or in addition to the textured inner surface and/or outer surface of the friction bushing, it may also be conceivable to profile the contact surface of the circular ring shaped recess engaged by the friction bushing.

According to another feature of the present invention, the contact zones of the damping unit may be coated or wetted by a lubricant. The use of lubricant allows influence on the friction torque of the damping unit and may be applied in any suitable manner.

According to another feature of the present invention, the friction bushing may be formfittingly secured to the respective component of the tensioner. This ensures during assembly an unimpeded placement of the conically extending inner and outer surfaces in the complementary circular ring shaped recess of the other component of the tensioner. In addition to a formfitting connection, which for example includes partially arranged pins or projections for engagement in respective holes of the component to which the friction bushing is securely fixed, it is possible to additionally secure the friction bushing by a non-detachable connection, in particular by gluing or ultrasonic welding.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a longitudinal section of another embodiment of a tensioner according to the present invention;

FIG. 4 is an enlarged detailed view of the area encircled in FIG. 3 and marked "Y";

FIG. 5 shows a sectional view of a detail showing the tensioner of FIG. 4 with modified friction bushing;

FIG. 6 is an enlarged detailed view of a modified friction bushing; and

FIG. 7 shows a sectional view of a two-part friction bushing.

DETAILED DESCRIPTION OF PREFERRED EMBODIMENTS

Figure 1:
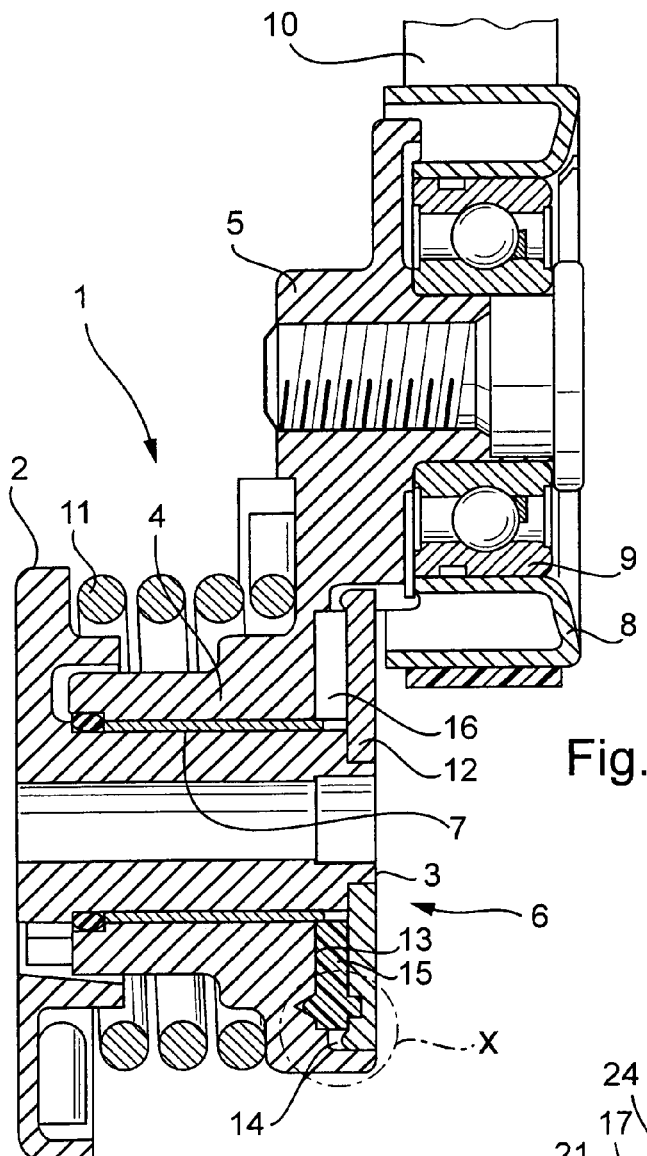
FIG. 1 is a longitudinal section of one embodiment of a tensioner according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a longitudinal section of one embodiment of a tensioner according to the present invention, generally designated by reference numeral 1 and including a stationary base part 2 having an axially protruding pin 3. The pin 3 forms together with a hub 4 of a pivot arm 5 a pivot bearing 6 which includes a sliding bearing bush 7 arranged in an installation space bounded radially by the hub 4 and the pin 3. Rotatably arranged via a roller bearing 9 on a free end of the pivot arm 5 is a running roller 8 which is supported directly on a power transmitting member, e.g. a belt 10. A force-fitting abutment of the roller 8 on the belt 10 is realized by a torsion spring 11 having one spring end resting against the base part 2 and another spring end resting against the pivot arm 5 for moving the pivot arm 5 to a position by which the tension force of the belt 10 is increased. The torsion spring 11 further applies an axial force to urge the pivot arm 5 in direction of a thrust washer 12 which is secured in fixed rotative engagement with the pin 3. A friction bushing 15 is disposed in an installation space 14 bounded axially by the thrust washer 12 and a support surface 13 of the pivot arm 5. The friction bushing 15 forms a damping unit for damping an adjustment movement of the pivot arm 5 and includes a slit 16.

Figure 2:
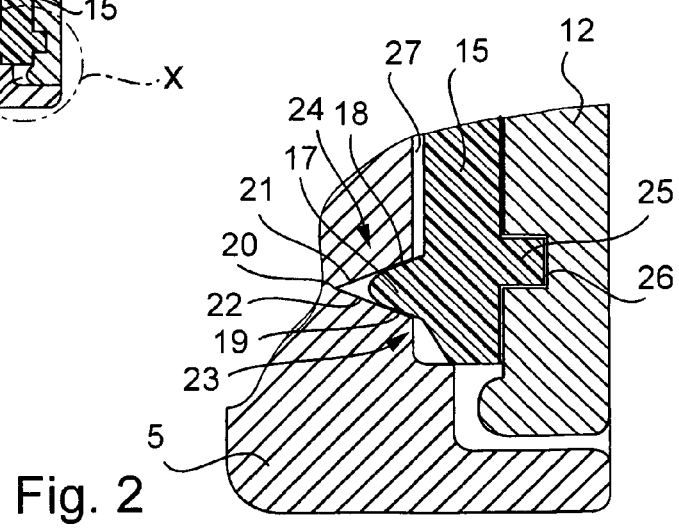
FIG. 2 is an enlarged detailed view of the area encircled in FIG. 1 and marked "X"

As shown in FIG. 2, which is an enlarged detailed view of the area encircled in FIG. 1 and marked "X", the friction bushing 15 is provided in the direction of the pivot arm 5 with an axially projecting protrusion 17 which has a conical inner surface 18 and a conical outer surface 19, whereby the conicity of the inner and outer surfaces is the same. The protrusion 17 formfittingly engages a circular ring shaped recess 20 of the pivot arm 5, with the inner and outer surfaces 18, 19 resting on pertaining contact surfaces 21, 22 of the recess 20 to thereby define two conically aligned contact zones 23, 24. When the friction bushing 15 is installed, a gap 27 is formed between the support surface 13 of the pivot arm 5 and the friction bushing 15. A defined frictional damping between the friction bushing 15 and the pivot arm 5 is realized by securely fixing the friction bushing 15 on the thrust washer 12. This is implemented by providing the friction bushing 15 with at least one projection 25 which formfittingly engages a bore 26 of the thrust washer 12.

FIG. 3 shows a longitudinal section of another embodiment of a tensioner according to the present invention, generally designated by reference numeral 31 and including a base part 32, which includes in midsection an axial guide bush 33. Placed in the bush 33 is a bearing pin 34 of a pivot arm 35, whereby the bush 33 defines together with the bearing pin 34 a pivot bearing 36. Disposed in an annular gap, bounded radially by the bush 33 and the bearing pin 34, is a sliding bearing bush 37. A roller 38 is provided at the free end of the pivot arm 35 and is rotatably supported by a roller bearing 39, whereby the roller 38 is supported in force-fitting manner upon a power transmitting member, e.g. a belt 40. The forced support of the roller 38 upon the belt 40 is realized by a torsion spring 41 having a first spring end resting against the base part 32 and a second spring end resting against the pivot arm 35. The axial force of the torsion spring 41 is borne by means of a thrust washer 42 which is secured in fixed rotative engagement to the bearing pin 34. The thrust washer 42 is hereby supported on a friction bushing 45 having a slit 46 and placed in an installation space 44 which is bounded axially by a support surface 43 of the base part 32 and the thrust washer 42.

As shown in FIG. 4, which is an enlarged detailed view of the area encircled in FIG. 3 and marked "Y", the friction bushing 45 is securely fixed to the thrust washer 42 by a projection 55 which protrudes axially from an outer circumference and formfittingly fits in a groove 56 of the thrust washer 42, thereby establishing a desired friction damping between the friction bushing 45 and the support surface 43 of the base part 32. The friction bushing 45, which forms a damping unit and is also provided with a slit 46, is provided on its side facing away from the thrust washer 42 with an axially projecting circumferential protrusion 47, configured to have a conical inner surface 48 and a conical outer surface 49. The protrusion 47 is fitted in the recess 50 of the base part 32, with the recess 50 being so sized that the protrusion 47 does not fully fill the cross sectional profile of the recess 50 so as to establish an axial gap 57 between the friction bushing 45 and the support surface 43 of the base part 32. The protrusion 47 is hereby supported via the inner and outer surfaces 48, 49 on substantially complementary conical contact surfaces 51, 52 of the recess 50 to thereby define in concert contact zones 53, 54. As shown in FIG. 6. at least one of the contact surfaces 51. 52 (here contact surface 52) of the recess 50 is provided with a profile 28.

FIG. 5 shows a sectional view of a detail showing the tensioner of FIG. 4 with modified friction bushing 45. Parts corresponding with those in FIG. 4 are denoted by identical reference numerals and not explained again. The description below will center on the differences between the embodiments. In this embodiment, the inner and outer surfaces 48, 49 of the friction bushing 45 converge to one another at a taper angle "a" which is ≦35°, whereby the outer surface 49 is formed with a profiling in form of a longitudinal groove 58. Through the provision of the groove 58, rubbed-off parts from the friction bushing 45 or contact surface 52 of the recess 50 during operation of the tensioner 31, can be expelled. As an alternative to remove wear-based abrasions from the contact zones 53, 54, the inner and outer surface 48, 49 may be formed with grooves in alternating pattern.

FIG. 7 shows a sectional view of a two-part friction bushing 45 which includes a carrier 29 and a friction lining 30 applied on the carrier 29 and made of plastic.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A tensioner for a traction drive to maintain a power transmitting member, e.g. a belt, under tension, comprising:
   a base part defining an axis;
   a pivot arm connected to the base part for swinging about a rotation axis and having a free end for rotatable arrangement of a roller which is supported on the power transmitting member;
   a spring member acting on the pivot arm for urging the roller against the power transmitting member; and
   a damping unit acted upon by an axial force of the torsion spring for damping an adjusting movement of the pivot arm, said damping unit including a slitted friction bushing which is subjected to the axial force only, said friction bushing disposed in concentric surrounding relationship to the rotation axis and constructed in the shape of a disk formed with a wedge ring having conical inner and outer surfaces for formfitting engagement in a circular ring shaped recess formed in a member selected from the group consisting of the base part and the pivot arm, wherein the recess has contact surfaces to complement the inner and outer surfaces of the friction bushing for formation of two conical contact zones.

2. The tensioner of claim 1, wherein the spring member is a torsion spring.

3. The tensioner of claim 1, wherein the inner surface and the outer surface of the friction bushing have a same conicity.

4. The tensioner of claim 3, wherein the conical inner and outer surfaces of the friction bushing converge at a taper angle of ≦35°.

5. The tensioner of claim 1, and further comprising a thrust washer connected to the base part, wherein the pivot arm has a hub rotatably supported on a pin of the base part, said friction bushing being disposed axially between the thrust washer and the hub.

6. The tensioner of claim 1, wherein the pivot arm has a hub rotatably supported on a pin of the base part, said friction bushing being disposed axially between a flange of the base part and the hub.

7. The tensioner of claim 1, wherein the base part has a bush, and further comprising a thrust washer connected to the base part, and a bearing pin in fixed rotative connection with the pivot arm and rotatably received in the bush of the base part, said friction bushing disposed axially between the base part and the thrust washer.

8. The tensioner of claim 1, and further comprising a thrust washer connected in fixed rotative engagement with one member of the group, with the recess being formed in the other member of the group, said friction bushing being connected to the thrust washer.

9. The tensioner of claim 8, wherein the friction bushing is formfittingly secured to the thrust washer.

10. The tensioner of claim 9, wherein the friction bushing is connected non-detachably to the thrust washer.

11. The tensioner of claim 10, wherein the friction bushing is connected to the thrust washer by gluing or ultrasonic welding.

12. The tensioner of claim 8, wherein the thrust washer is connected in fixed rotative engagement to the base part, and the recess is formed in the swingable pivot arm for engagement by the friction bushing.

13. The tensioner of claim 8, wherein the thrust washer is connected in fixed rotative engagement to the pivot arm, and the recess is formed in the base part for engagement by the friction bushing.

14. The tensioner of claim 1, wherein the friction bushing is made of plastic.

15. The tensioner of claim 1, wherein the friction bushing is made of glass fiber reinforced plastic.

16. The tensioner of claim 1, wherein the friction bushing is made of organic plastic.

17. The tensioner of claim 1, wherein at least one of the inner and outer surfaces of the friction bushing is profiled or textured.

18. The tensioner of claim 1, wherein the contact surfaces of the recess are profiled or textured.

19. The tensioner of claim 1, wherein the contact zones of the damping unit are coated by a lubricant.

20. The tensioner of claim 1, wherein the contact zones are free of lubricant.

* * * * *